US012615520B2

(12) United States Patent
Chung et al.

(10) Patent No.:    US 12,615,520 B2
(45) Date of Patent:       Apr. 28, 2026

(54) METHOD AND DEVICE FOR REFERENCE SIGNAL LINKAGE-BASED DOWNLINK TRANSMISSION/RECEPTION IN WIRELESS COMMUNICATION SYSTEM

(71) Applicant: LG ELECTRONICS INC., Seoul (KR)

(72) Inventors: Jaehoon Chung, Seoul (KR); Seongwon Go, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 635 days.

(21) Appl. No.:     17/759,484

(22) PCT Filed:     Apr. 14, 2021

(86) PCT No.:     PCT/KR2021/004684
§ 371 (c)(1),
(2) Date:     Dec. 2, 2022

(87) PCT Pub. No.: WO2021/210906
PCT Pub. Date: Oct. 21, 2021

(65)     Prior Publication Data
US 2023/0345259 A1     Oct. 26, 2023

(30)     Foreign Application Priority Data
Apr. 17, 2020     (KR) ........................ 10-2020-0046769

(51) Int. Cl.
H04W 16/28     (2009.01)
H04L 5/00     (2006.01)
(52) U.S. Cl.
CPC ........... H04W 16/28 (2013.01); H04L 5/0051 (2013.01)

(58) Field of Classification Search
CPC . H04W 16/28; H04W 72/231; H04W 72/046; H04W 72/1273; H04L 5/0051;
(Continued)

(56)     References Cited

U.S. PATENT DOCUMENTS

2019/0297603 A1     9/2019     Guo et al.
2020/0077395 A1     3/2020     Guo

FOREIGN PATENT DOCUMENTS

JP     2020-506583     2/2020
WO     2020-012662     1/2020

OTHER PUBLICATIONS

PCT International Application No. PCT/KR2021/004684, International Search Report dated Jul. 29, 2021, 4 pages.
(Continued)

*Primary Examiner* — Eric Myers
(74) *Attorney, Agent, or Firm* — LEE, HONG, DEGERMAN, KANG & WAIMEY

(57)     ABSTRACT

Disclosed are a method and a device for performing a downlink transmission or reception on the basis of reference signal linkage in a wireless communication system. According to an embodiment of the present disclosure, a method for performing a downlink reception by a terminal in a wireless communication system may comprise: a reference signal (RS) linkage information reception step of receiving information on RS linkage from a base station, wherein the RS linkage includes information on a mapping relationship between a reference RS resource and one or more target RS resources; a step of receiving, from the base station, information on a first spatial parameter for the reference RS resource related to specific RS linkage; and a step of performing the downlink reception on the basis of a second spatial parameter corresponding to the first spatial parameter with respect to a specific target transmission or reception among one or more target transmissions or receptions
(Continued)

TERMINAL                                          BASE STATION

SRS Config. IE          S1010
(usage-BM, SRS-SpatialRelation Info)

S1020 — Determine Tx beam for
            SRS resource

S1030
Transmitting SRS through determined Tx beam

S1040
feedback mapped to a reference transmission or reception related to the specific RS linkage.

14 Claims, 17 Drawing Sheets

(58) Field of Classification Search
CPC ... H04L 5/0016; H04L 5/0023; H04L 5/0048; H04L 5/0094; H04B 7/06968; H04B 7/088
See application file for complete search history.

(56) References Cited

OTHER PUBLICATIONS

3rd Generation Partnership Project, "Technical Specification Group Radio Access Network; NR; Physical layer procedures for data (Release 16)," 3GPP TS 38.214 V16.1.0, Mar. 2020, 152 pages.

Nokia et al., "Enhancements on Multi-beam Operation," R1-1907317, 3GPP TSG RAN WG1 #97 Meeting, May 2019, 20 pages.

Samsung, "Enhancements on multi-beam operations," R1-1908502, 3GPP TSG RAN WG1 #98, Aug. 2019, 11 pages.

Fraunhofer Iis et al., "Enhancements on UE multi-beam operation," R1-1910432, 3GPP TSG RAN WG1 Meeting #97, Aug. 2019, 7 pages.

Japan Patent Office Application No. 2022-554936, Office Action dated Jun. 3, 2025, 2 pages.

Base station Rx beam sweeping

Terminal Tx beam (fixed)

(a)

Base station Rx beam fixed

Terminal Tx beam sweeping (b)

FIG.17

METHOD AND DEVICE FOR REFERENCE SIGNAL LINKAGE-BASED DOWNLINK TRANSMISSION/RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2021/004684, filed on Apr. 14, 2021, which claims the benefit of earlier filing date and right of priority to Korean Application No. 10-2020-0046769, filed on Apr. 17, 2020, the contents of which are all hereby incorporated by reference herein in their entireties.

TECHNICAL FIELD

The present disclosure relates to a wireless communication system, and more particularly, to a method and apparatus for performing downlink transmission/reception based on a reference linkage in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for performing downlink transmission and reception based on a reference signal (RS) linkage in a wireless communication system.

An additional technical object of the present disclosure is to provide a method and an apparatus for configuring a RS linkage candidate and activating or indicating a RS linkage in a wireless communication system.

An additional technical object of the present disclosure is to provide a method and an apparatus for determining a target RS resource based on a RS linkage and a reference RS resource in a wireless communication system.

An additional technical object of the present disclosure is to provide a method and an apparatus for determining a spatial parameter to be applied with respect to a target RS resource associated with a reference RS by RS linkage in a wireless communication system.

The technical objects to be achieved by the present disclosure are not limited to the above-described technical objects, and other technical objects which are not described herein will be clearly understood by those skilled in the pertinent art from the following description.

Technical Solution

A method of performing downlink reception by a user equipment (UE) in a wireless communication system according to an aspect of the present disclosure may comprise: receiving, from a base station (BS), information on a reference signal (RS) linkage, wherein the RS linkage includes information on a mapping relation between a reference RS resource and at least one target RS resource; receiving, from the BS, information on a first spatial parameter for the reference RS resource associated with a specific RS linkage; and performing the downlink reception based on a second spatial parameter corresponding to the first spatial parameter, for a specific target transmission and reception among the at least one target transmission and reception mapped to the reference transmission and reception associated with the specific RS linkage.

A method of performing downlink transmission by a base station (BS) in a wireless communication system according to an additional aspect of the present disclosure may comprise: transmitting, to a user equipment (UE), information on a reference signal (RS) linkage, wherein the RS linkage includes information on a mapping relation between a reference RS resource and at least one target RS resource; transmitting, to the UE, information on a first spatial parameter for the reference RS resource associated with a specific RS linkage; and performing the downlink transmission based on a second spatial parameter corresponding to the first spatial parameter, for a specific target transmission and reception among the at least one target transmission and reception mapped to the reference transmission and reception associated with the specific RS linkage.

Technical Effects

According to the present disclosure, a method and an apparatus for performing downlink transmission and reception based on reference signal (RS) linkage in a wireless communication system may be provided.

According to the present disclosure, a method and an apparatus for setting a RS linkage candidate and activating or indicating for a RS linkage may be provided in a wireless communication system.

According to the present disclosure, a method and an apparatus for determining a target RS resource based on a RS linkage and a reference RS resource in a wireless communication system may be provided.

According to the present disclosure, a method and an apparatus for determining a spatial parameter to be applied for a target RS resource associated with a reference RS by a RS linkage in a wireless communication system may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 12 is a diagram which illustrates resource allocation in a time and frequency domain related to a downlink beam management operation in a wireless communication system to which the present disclosure may be applied.

FIG. 17 is a diagram which illustrates a block diagram of a wireless communication device according to an embodiment of the present disclosure.

BEST MODE

Figure 1:
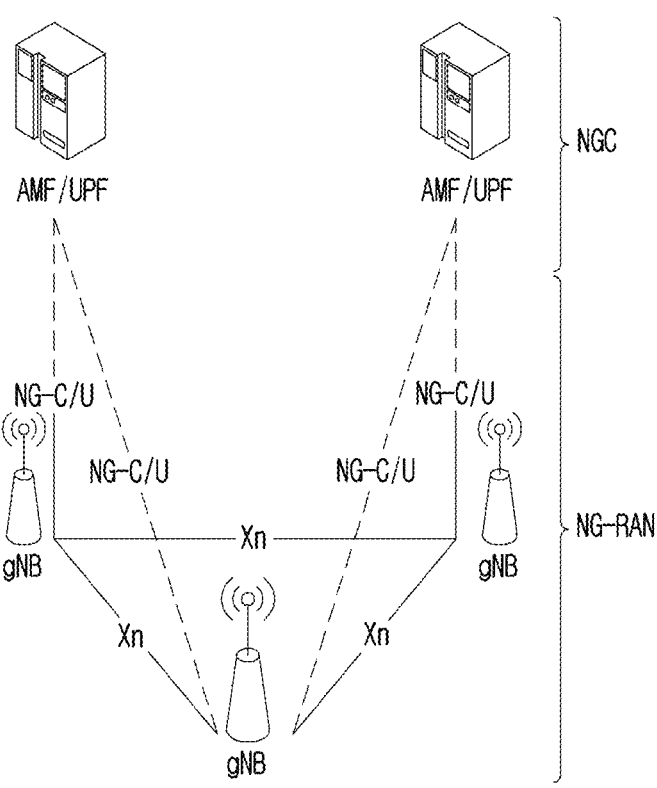
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A. NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management

CQI: Channel Quality Indicator

CRI: channel state information-reference signal resource indicator

CSI: channel state information

CSI-IM: channel state information-interference measurement

CSI-RS: channel state information-reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
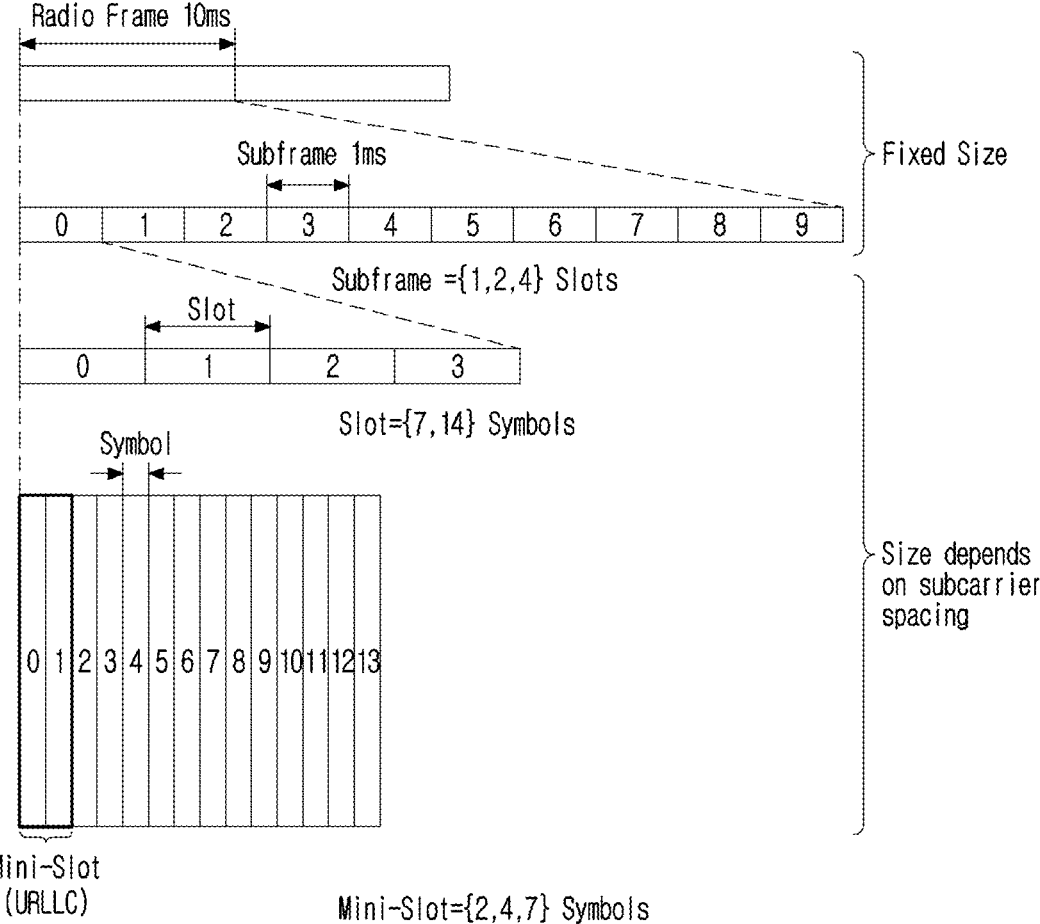
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 KHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration μ, slots are numbered in an increasing order of $$n_s^\mu \in \{0, \dots, N_{slot}^{subframe,\mu} - 1\}$$

in a subframe and are numbered in an increasing order of $$n_{s,f}^\mu \in \{0, \dots, N_{slot}^{frame,\mu} - 1\}$$

in a radio frame. One slot is configured with $N_{symb}^{slot}$ consecutive OFDM symbols and $N_{symb}^{slot}$ is determined according to CP. A start of a slot $$n_s^\mu$$

in a subframe is temporally arranged with a start of an OFDM symbol $$n_s^\mu N_{symb}^{slot}$$

in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame $$\left(N_{slot}^{frame,\mu}\right)$$

and the number of slots per subframe $$\left(N_{slot}^{subframe,\mu}\right)$$

in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
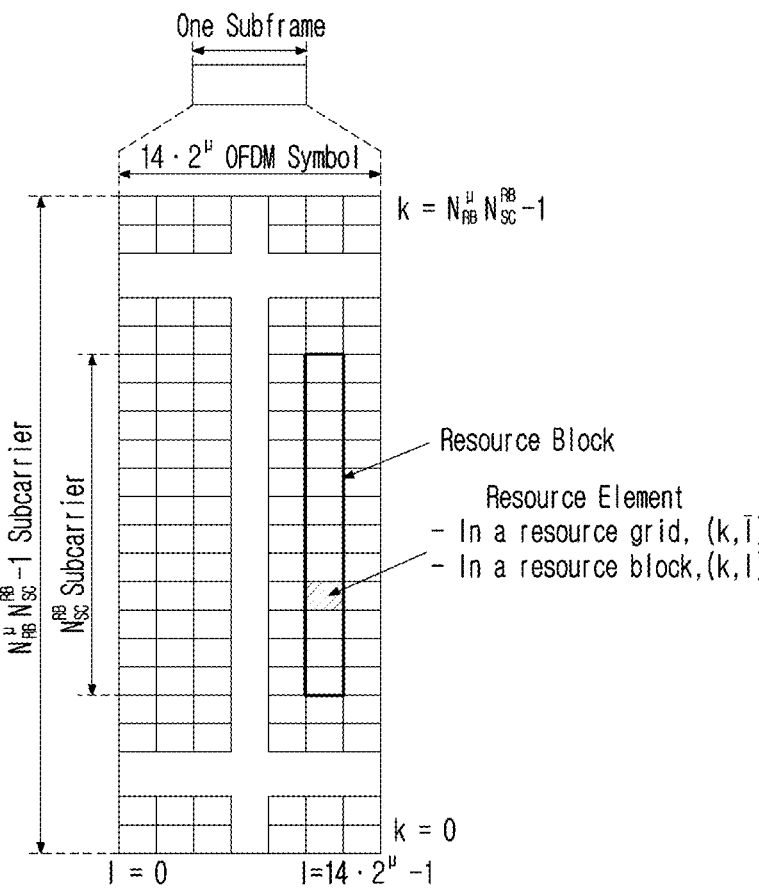
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $$N_{RB}^{\mu} N_{sc}^{RB}$$

subcarriers in a frequency domain and one subframe is configured with 14·2$^{\mu}$ OFDM symbols, but it is not limited thereto. In an NR system, a transmitted signal is described by OFDM symbols of $$2^{\mu} N_{symb}^{(\mu)}$$

and one or more resource grids configured with $$N_{RB}^{\mu} N_{sc}^{RB}$$

subcarriers. Here, $$N_{RB}^{\mu} \leq N_{RB}^{max,\mu}.$$

The $$N_{RB}^{max,\mu}$$

represents a maximum transmission bandwidth, which may be different between an uplink and a downlink as well as between numerologies. In this case, one resource grid may be configured per μ and antenna port p. Each element of a resource grid for u and an antenna port p is referred to as a resource element and is uniquely identified by an index pair (k,l'). Here, $$k = 0, \dots , N_{RB}^{\mu} N_{sc}^{RB} - 1$$

is an index in a frequency domain and $$1' = 0, \dots , 2^{\mu} N_{symb}^{(\mu)} - 1$$

refers to a position of a symbol in a subframe. When referring to a resource element in a slot, an index pair (k,l) is used. Here, $$1 = 0, \dots , N_{symb}^{(\mu)} - 1.$$

A resource element (k,l') for μ and an antenna port p corresponds to a complex value, $$a_{k,l'}^{(p,\mu)}.$$

When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}$=12 consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $$n_{CRB}^{\mu}$$

and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor$$

[Equation 1]

In Equation 1, k is defined relatively to point A so that k=0 corresponds to a subcarrier centering in point A. Physical resource blocks are numbered from 0 to $$N_{BWP,i}^{size,\mu} - 1$$

in a bandwidth part (BWP) and i is a number of a BWP. A relationship between a physical resource block nPRB and a common resource block $n_{CRB}$ in BWP i is given by the following Equation 2.

$$n_{CRB}^{\mu} = n_{PRB}^{\mu} + N_{BWP,i}^{start,\mu}$$ [Equation 2]

$$N_{BWP,i}^{start,\mu}$$

is a common resource block that a BWP starts relatively to common resource block 0.

Figure 4:
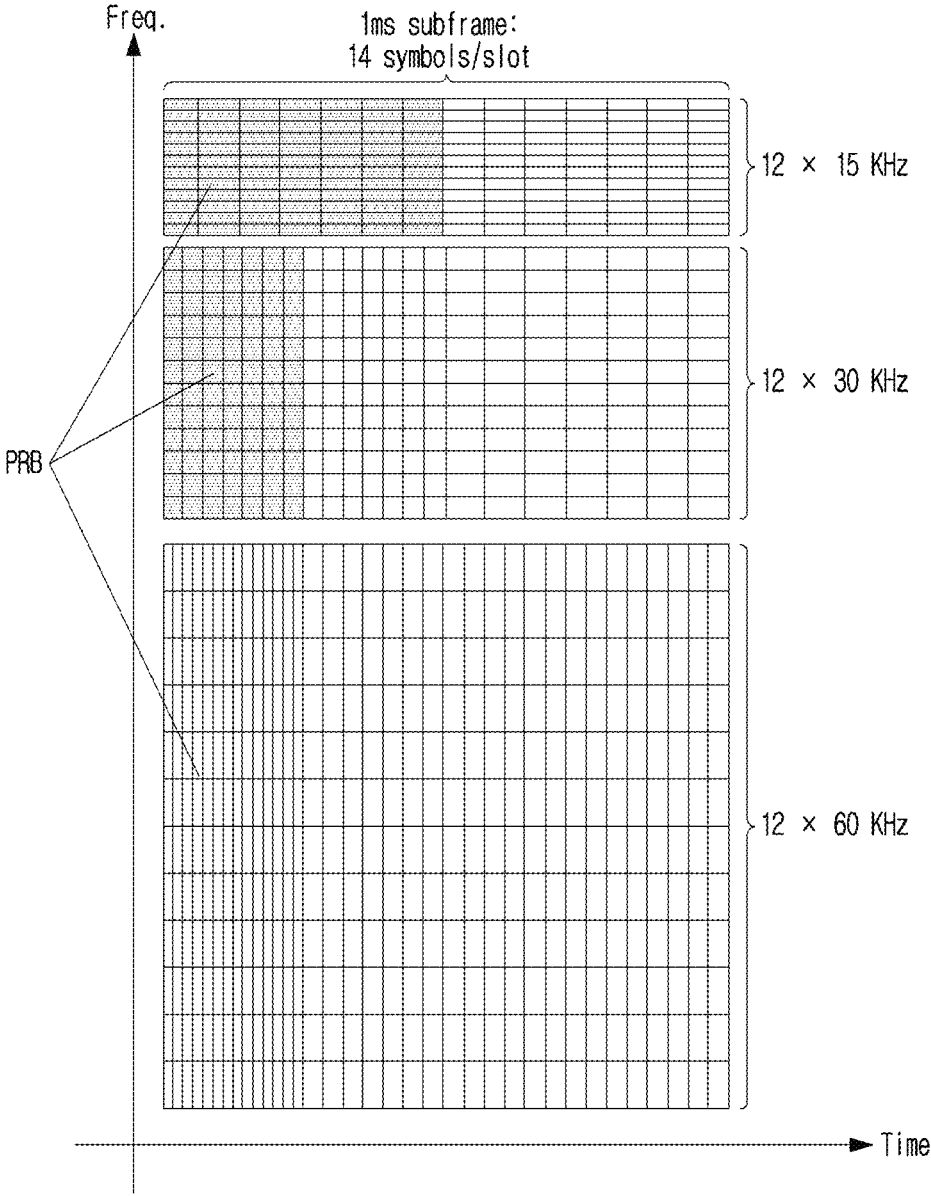
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
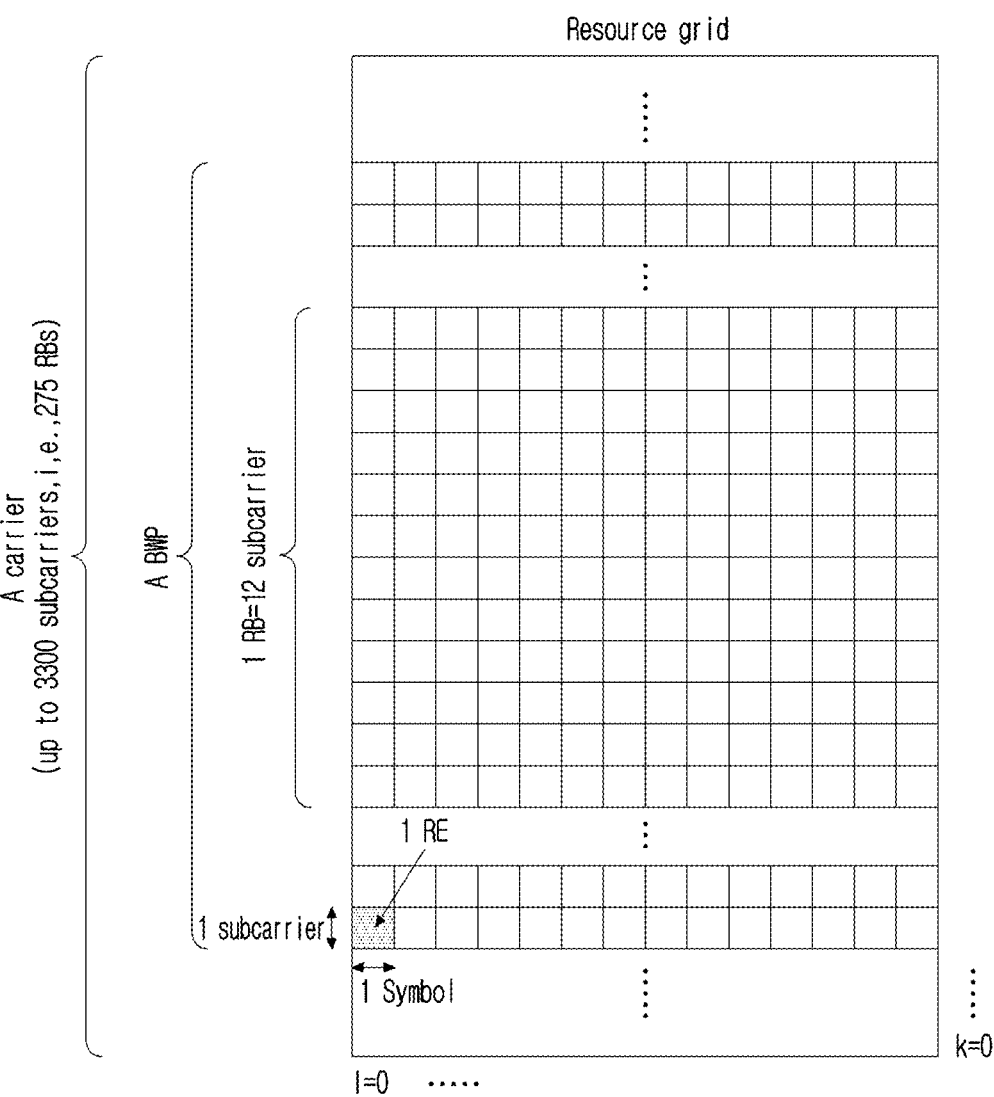
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
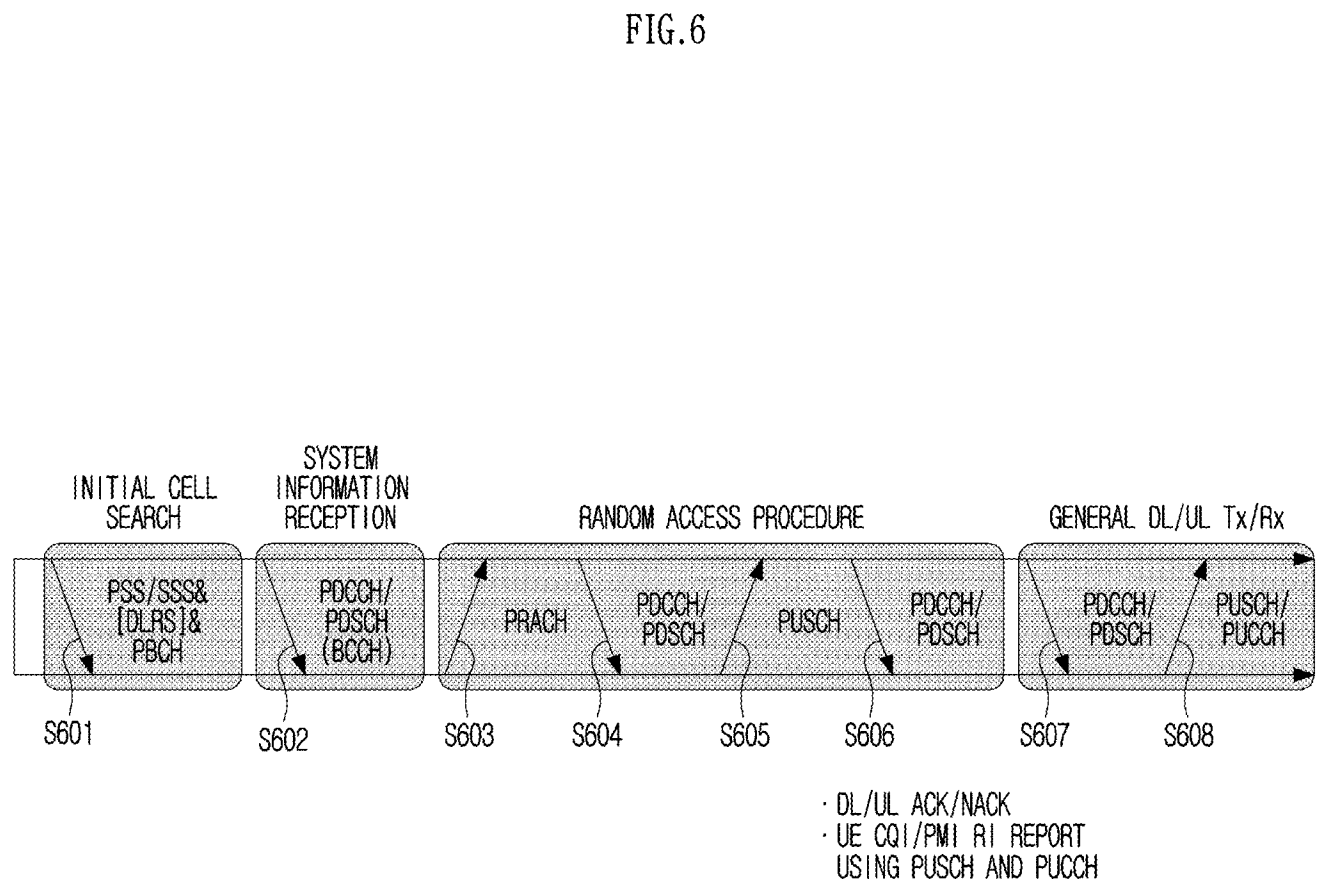

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier)(s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
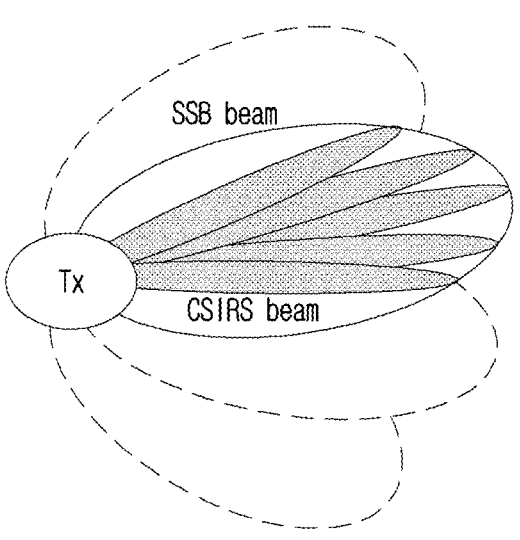
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
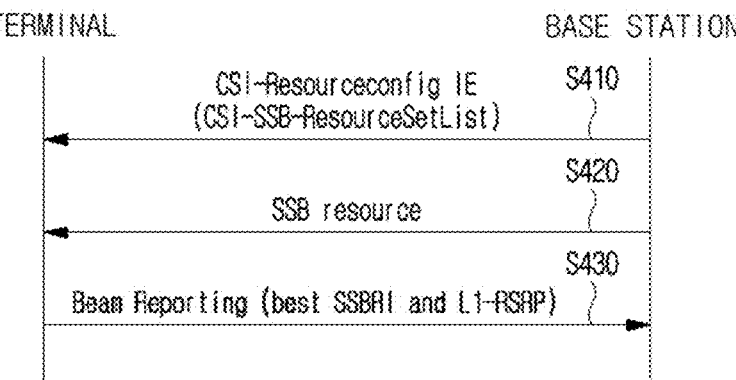
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to

TABLE 6

```
ASN1START
TAG-CSI-RESOURCECONFIG-START
CSI-ResourceConfig ::=          SEQUENC {
csi-ResourceConfigId           CSI-ResourceConfigId,
csi-RS-ResourceSetList          CHOICE {
nzp-CSI-RS-SSB                  SEQUENCE {
nzp-CSI-RS-ResourceSetList    SEQUENCE (SIZE (1..maxNrofNZP-CSI-RS-
ResourceSetsPerConfig)) OF NZP-CSI-RS-ResourceSetId OPTIONAL,
csi-SSB-ResourceSetList       SEQUENCE (SIZE (1..maxNrofCSI-SSB-
ResourceSetsPerConfig)) OF CSI-SSB-ResourceSetId OPTIONAL
},
csi-IM-ResourceSetList         SEQUENCE (SIZE (1..maxNrofCSI-IM-
ResourceSetsPerConfig)) OF CSI-IM-ResourceSetId
},
bwp-Id                         BWP-Id,
resourceType                   ENUMERATED { aperiodic, semiPersistent,
periodic },
...
}
TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher receive a different periodicity in periodicityAndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
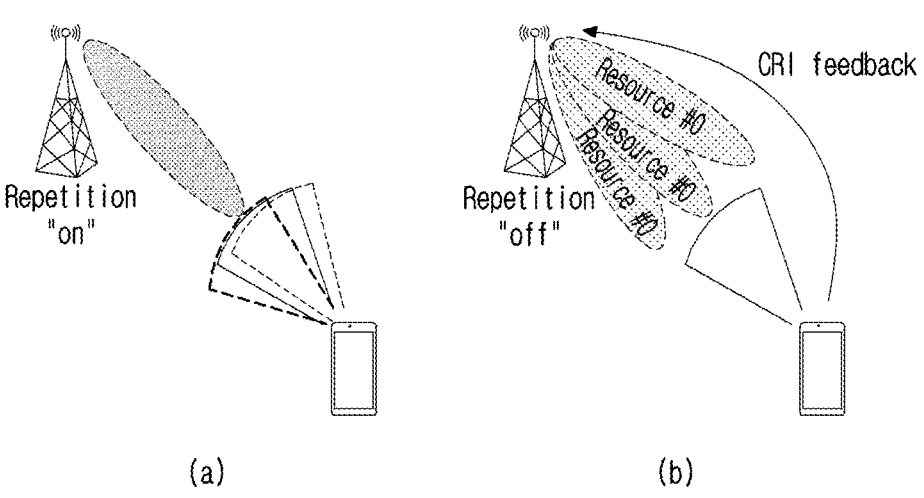
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(*a*) represents a Rx beam determination (or refinement) procedure of a terminal and FIG. 9(*b*) represents a Tx beam sweeping procedure of a base station. In addition, FIG. 9(*a*) is a case when a repetition parameter is configured as 'ON' and FIG. 9(*b*) is a case when a repetition parameter is configured as 'OFF'.

Figure 10:
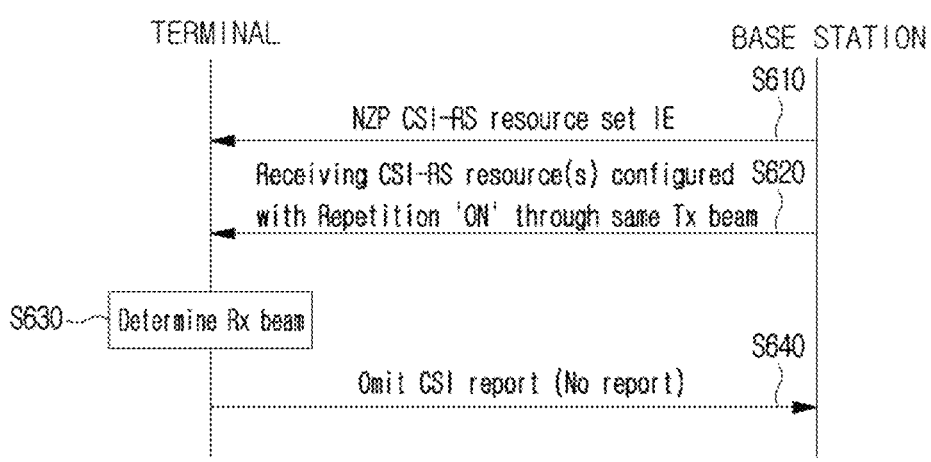
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(*a*) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
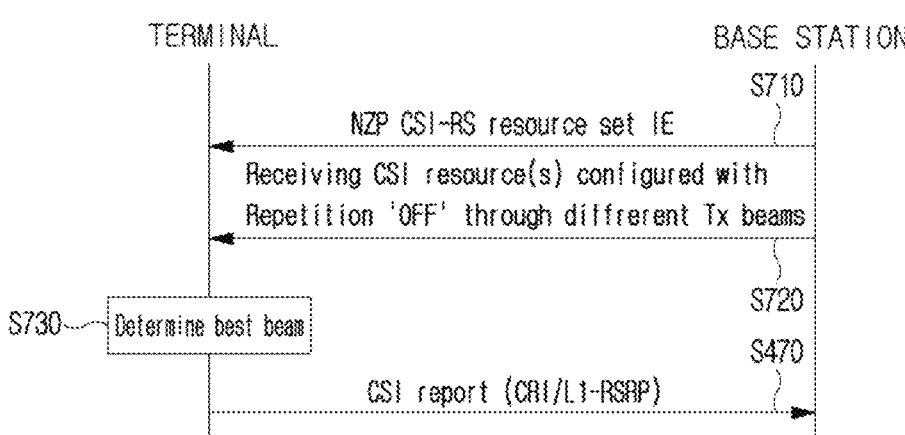
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(*b*) and FIG. 11, a Tx beam determination process of a base station is described.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
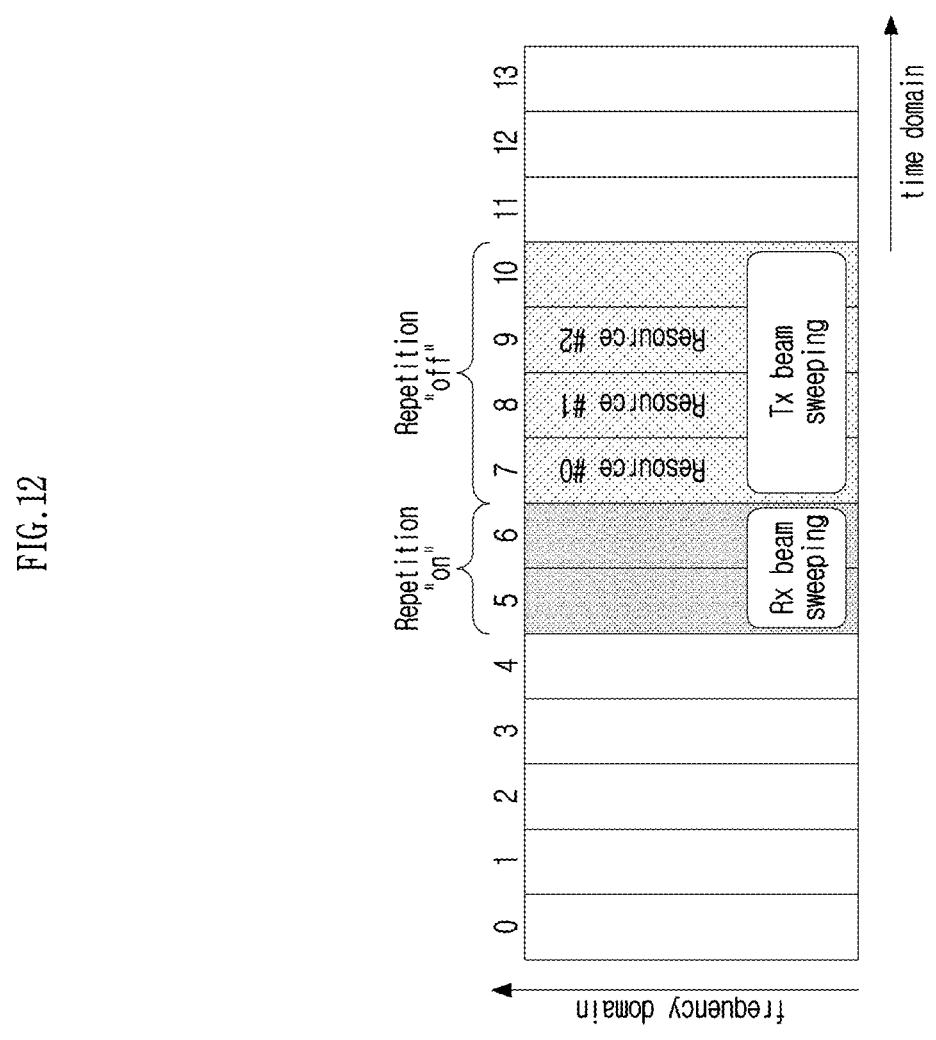

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

```
ASN1START
TAG-TCI-STATE-START
TCI-State ::=                SEQUENCE {
tci-StateId                     TCI-StateId,
qcl-Type1                       QCL-Info,
qcl-Type2                       QCL-Info
                      OPTIONAL, -- Need R
...
}
QCL-Info ::=                 SEQUENCE {
cell                            ServCellIndex
                      OPTIONAL,  -- Need R
bwp-Id                          BWP-Id
                      OPTIONAL, -- Cond CSI-RS-Indicated
referenceSignal                 CHOICE {
csi-rs                             NZP-CSI-RS-ResourceId,
ssb                                SSB-Index
},
qcl-Type                        ENUMERATED {typeA, typeB, typeC, typeD},
...
}
TAG-TCI-STATE-STOP
-- ASN1STOP
```

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

In Table 7, a bwp-Id parameter represents a DL BWP (bandwidth part) where an RS is located, a cell parameter represents a carrier where a RS is located and a reference signal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling. RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
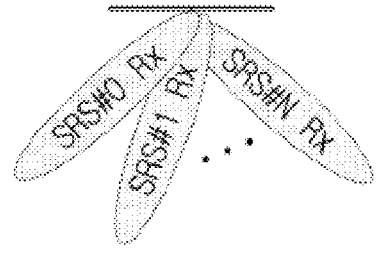
FIG. 13 is a diagram which illustrates an uplink beam management operation using SRS in a wireless communication system to which the present disclosure may be applied.
Figure 13:
Figure 13:
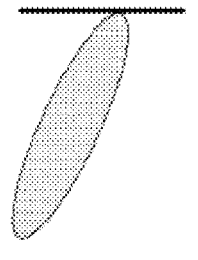
Figure 13:

FIG. 13 is a diagram which illustrates an uplink beam management operation using SRS in a wireless communication system to which the present disclosure may be applied.

FIG. 13(a) illustrates a Rx beam determination operation of a base station and FIG. 13(b) illustrates a Tx beam sweeping operation of a terminal.

Figure 14:
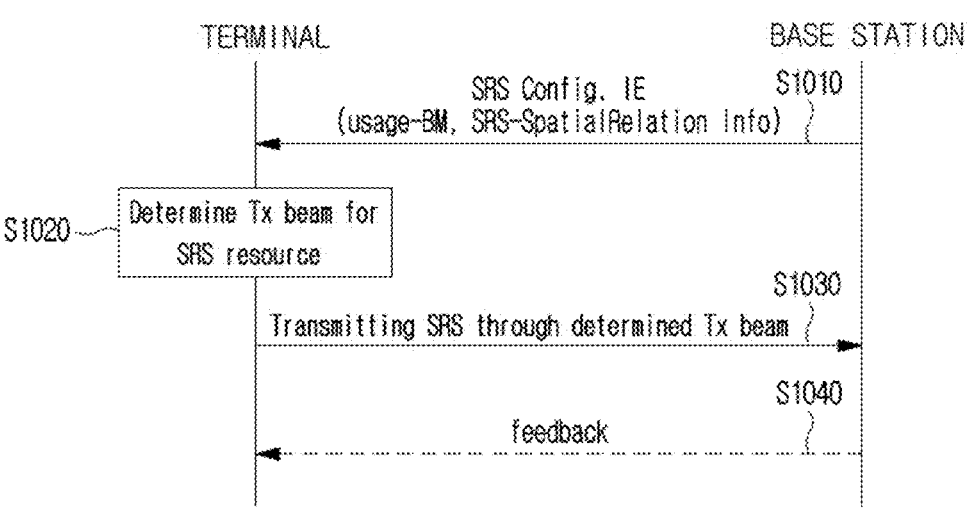
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

| | |
|---|---|
| ASN1START | |
| TAG-MAC-CELL-GROUP-CONFIG-START | |
| SRS-Config ::= | SEQUENCE { |
| srs-ResourceSetToReleaseList | SEQUENCE (SIZE(1..maxNrofSRS- |
| ResourceSets)) OF SRS-ResourceSetId | OPTIONAL, -- Need N |
| srs-ResourceSetToAddModList | SEQUENCE (SIZE(1..maxNrofSRS- |
| ResourceSets)) OF SRS-ResourceSet | OPTIONAL, -- Need N |
| srs-ResourceToReleaseList | SEQUENCE (SIZE(1..maxNrofSRS- |
| Resources)) OF SRS-ResourceId | OPTIONAL, -- Need N |
| srs-ResourceToAddModList | SEQUENCE (SIZE(1..maxNrofSRS- |
| Resources)) OF SRS-Resource | OPTIONAL, -- Need N |
| tpc-Accumulation | ENUMERATED {disabled} |
| | OPTIONAL, -- Need S |
| ... | |
| } | |
| SRS-ResourceSet ::= | SEQUENCE { |
| srs-ResourceSetId | SRS-ResourceSetId, |
| srs-ResourceIdList | SEQUENCE (SIZE(1..maxNrofSRS- |
| ResourcesPerSet)) OF SRS-ResourceId | OPTIONAL, -- Cond Setup |
| resourceType | CHOICE { |
| aperiodic | SEQUENCE { |
| aperiodicSRS-ResourceTrigger | INTEGER (1..maxNrofSRS-TriggerStates-1), |
| csi-RS | NZP-CSI-RS-ResourceId |
| OPTIONAL, | -- Cond NonCodebook |
| slotOffset | INTEGER (1..32) |
| OPTIONAL, | -- Need S |
| ... | |
| }, | |
| semi-persistent | SEQUENCE { |
| associatedCSI-RS | NZP-CSI-RS-ResourceId |
| OPTIONAL, -- Cond NonCodebook | |
| ... | |
| }, | |
| periodic | SEQUENCE { |
| associatedCSI-RS | NZP-CSI-RS-ResourceId |
| OPTIONAL, -- Cond NonCodebook | |
| ... | |
| } | |
| }, | |

TABLE 8-continued

| | |
|---|---|
| usage | ENUMERATED {beamManagement, |
| codebook, nonCodebook, antennaSwitching}, | |
| alpha | Alpha |
| | OPTIONAL, -- Need S |
| p0 | INTEGER (−202..24) |
| | OPTIONAL, -- Cond Setup |
| pathlossReferenceRS | CHOICE { |
| ssb-Index | SSB-Index, |
| csi-RS-Index | NZP-CSI-RS-ResourceId |
| SRS-SpatialRelationInfo ::= SEQUENCE { | |
| servingCellId | ServCellIndex |
|   OPTIONAL, -- Need S | |
| referenceSignal | CHOICE { |
| ssb-Index | SSB-Index, |
| csi-RS-Index | NZP-CSI-RS-ResourceId, |
| srs | SEQUENCE { |
| resourceId | SRS-ResourceId, |
| uplinkBWP | BWP-Id |
| } | |
| } | |
| } | INTEGER |
| SRS-ResourceId ::= | |
| (0..maxNrofSRS-Resources-1) | |

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelation-Info' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRela-tionInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRe-lationInfo is not configured for an SRS resource, the termi-nal randomly determines a Tx beam and transmits an SRS through the determined Tx beam (S1030).

In more detail, for a P-SRS that 'SRS-ResourceConfig-Type' is configured as 'periodic':
    i) when SRS-SpatialRelationInfo is configured as 'SSB/ PBCH', a UE transmits a corresponding SRS resource by applying the same spatial domain transmission filter (or generated by a corresponding filter) as a spatial domain Rx filter used for SSB/PBCH reception; or
    ii) when SRS-SpatialRelationInfo is configured as 'CSI-RS', a UE transmits a SRS resource by applying the same spatial domain transmission filter used for peri-odic CSI-RS or SP (semi-persistent) CSI-RS reception; or
    iii) when SRS-SpatialRelationInfo is configured as 'SRS', a UE transmits a corresponding SRS resource by apply-ing the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).
    i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.
    ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.
    iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $$n + 3N_{slot}^{subframe,\mu} + 1.$$

After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL. UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1. UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL). UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE. UE may expect that a tci-PresentInDCI parameter is set to be enabled for a corresponding CORESET. When one or more TCI states are configured for a serving cell scheduled by a search space set including QCL-TypeD. UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDuration-ForQCL). UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-Resource-Set including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Downlink Transmission and Reception Based on a Reference Signal Linkage

Hereinafter, various examples of the present disclosure for downlink transmission and reception based on a reference signal (RS) linkage will be described.

A spatial parameter (or a parameter related to beam transmission/reception) related to downlink transmission/reception may include QCL information applied to a physical channel through which downlink control information or data is transmitted and received or assumed by the terminal. The QCL information may include QCL reference signal (RS) information, and the QCL RS information may be configured for each QCL type (e.g., QCL type A/B/C/D). For example, downlink control information (DCI) may be transmitted and received through PDCCH, and a spatial parameter related to DCI transmission/reception may include QCL reference information for PDCCH DMRS antenna port(s), TCI state information, etc. In addition, downlink data may be transmitted and received through PDSCH, and a spatial parameter related to downlink data transmission/reception may include QCL reference information for PDSCH DMRS antenna port(s), TCI state information, etc.

However, in the present disclosure, the term spatial parameter is not limited to QCL information and may include a spatial parameter applied to uplink transmission (e.g., spatial relation info related to an uplink transmission beam). For example, uplink control information (UCI) may be transmitted/received through PUCCH and/or PUSCH, and a spatial parameter related to UCI transmission/reception may include PRI (resource indicator) and spatial relation info related to PUCCH/PUSCH transmission/reception, or QCL reference RS related to thereof, etc.

In addition, a spatial parameter may be separately set for downlink or uplink, or may be configured integrally for downlink and uplink.

In addition, a spatial parameter may also be defined or configured as a spatial parameter set including at least one spatial parameter. Hereinafter, in order to simplify the description, at least one spatial parameter is collectively referred to as a spatial parameter.

In order for the base station to configure/indicate the PDCCH reception spatial parameter (or reception beam) of the terminal, it may configure/update the TCI state ID for each of one or more CORESETs. The TCI state configured for CORESET may indicate QCL reference information (e.g., QCL type D related information) for PDCCH DMRS antenna port(s) transmitted through the corresponding CORESET. That is, QCL reference information (e.g., QCL Type D information) of the TCI state ID configured/updated for each CORESET may correspond to the PDCCH reception beam of the terminal.

In the case of a spatial parameter (or reception beam) configuration/indication for PDSCH reception, a TCI field may be included in the PDCCH DCI for scheduling the corresponding PDSCH. The TCI status ID (or TCI codepoint) indicated by the TCI field in DCI may indicate QCL reference information (e.g., QCL type D related information) for the PDSCH DMRS antenna port(s).

Configuring/indicating a spatial parameter for PDSCH reception may be dynamically performed through DCI, since the spatial parameter indicated through DCI is limited to spatial parameter candidates which are preconfigured through higher layer signaling (e.g., RRC/MAC CE), higher layer signaling is required to change/update a spatial parameter for PDSCH reception. Since a spatial parameter for PDCCH reception is based on CORESET configuration, RRC reconfiguration or MAC CE message transmission for CORESET configuration/update is required to configure/ indicate the spatial parameter for PDCCH reception. In addition, when spatial parameter information (e.g., TCI field) is not included in the DCI for scheduling the PDSCH, the spatial parameter for PDSCH reception may be applied based on the spatial parameter configured for the CORESET in which the DCI is monitored. In addition, even if spatial parameter information (e.g., TCI field) is included in the DCI for scheduling the PDSCH, when a time interval (or scheduling offset) between a timing at which a DCI/PDCCH scheduling a PDSCH is received and a timing at which the corresponding PDSCH is received is less than or equal to a predetermined threshold, the spatial parameter for PDSCH reception may be applied based on the default spatial parameter (e.g., the TCI state associated with the CORESET or SS set having the lowest identifier in the latest slot monitored by the terminal).

For example, the TCI state may include reception beam information for a DL RS/channel. For example, it may be defined which QCL type is applied to which RS resource for each TCI state ID. For example, the TCI state may be exemplarily configured as shown in Table 9.

TABLE 9

| TCI state ID | QCL-info | |
| | Reference RS {CSI-RS, SSB} | QCL-Type {A, B, C, D} |
| --- | --- | --- |
| #1 | CSI-RS resource #3 | Type D |
| #2 | SSB resource #2 | Type D |
| #3 | CSI-RS resource #4 | Type D |

In addition, in transmission beam configuration/update for uplink transmission (UL RS/UL channel), an aperiodic/ semi-static SRS spatial-related update operation according to RRC reconfiguration and MAC CE message transmission is required to update spatial relation info for transmission beam change. For example, the spatial-related information may include information on a target (UL) RS indicated/ configured for an SRS resource. Accordingly, a spatial transmission parameter for the target (UL) RS may be determined. For example, spatial-related information may be updated through MAC CE. For example, for the SRS resource set ID, specific UL RS(s) to be changed/updated according to a predetermined order of the SRS resource(s) included in the corresponding set may be configured. For example, spatial-related information may be exemplarily configured as shown in Table 10.

TABLE 10

| Spatial relation info | |
| Reference RS {CSI-RS, SSB, SRS} | Target signal |
| --- | --- |
| CSI-RS# resource 1 | SRS resource#1 (BM) |
| SSB resource #1 | SRS resource#2 (CB) |
| SRS resource #1 | SRS resource#3 (non-CB) |
| CSI-RS resource #2 | SRS resource#4 (AS) |

In this way, if the change/update of a spatial parameter/ transmission and reception beam for DL/UL transmission and reception is performed through higher layer signaling (e.g., RRC/MAC CE), there is a disadvantage in that not only flexibility is reduced but also requiring unnecessary signaling overhead according to the change/update exists.

In order to solve such a problem, in the following examples, while minimizing signaling overhead, DL trans- mission/reception based on a reference signal linkage (RS linkage) will be described.

In the following description, spatial parameter or spatial relation info may mean including RS information/QCL related (or reference) RS information/QCL parameters, or the like for spatial related assumption for data/signal trans- mitted/received through UL channel/DL channel, or may be expressed by being mixed/replaced by the above terms.

In the following examples, the meaning of using/apply- ing/mapping a specific spatial parameter (or TCI state or TCI) when transmitting/receiving data/DCI/UCI for a cer- tain frequency/time/spatial resource is that in the case of DL estimating a channel from DMRS using the QCL type and QCL RS indicated by the corresponding spatial parameter in corresponding frequency/time/spatial resources and receiv- ing/demodulating data/DCI (e.g., PDSCH/PDCCH) with the estimated channel and in the case of UL transmitting/ modulating DMRS and data/UCI (e.g., PUSCH/PUCCH) using transmission beam and/or transmission power indi- cated by the corresponding spatial parameter in correspond- ing frequency/time/spatial resources.

Figure 15:
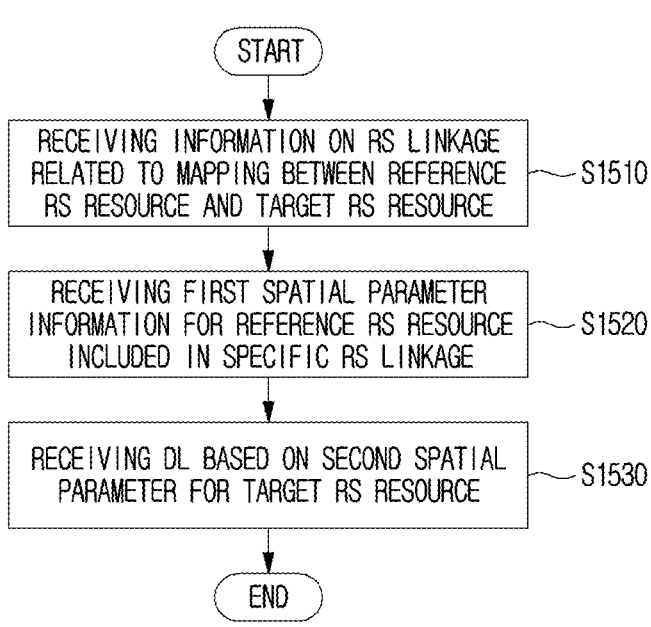
FIG. 15 is a flowchart illustrating a method of performing downlink reception by a terminal based on a reference signal linkage according to the present disclosure.

FIG. 15 is a flowchart illustrating a method of performing downlink reception by a terminal based on a reference signal linkage according to the present disclosure.

In step S1510, the terminal may receive information on RS linkage from the base station.

For example, the terminal may receive configuration information for at least one candidate of a RS linkage from the base station. The configuration information may be configured for the terminal through higher layer signaling (e.g., RRC signaling/MAC CE signaling).

The RS linkage may include information on a mapping relation between at least one reference RS and at least one target RS. For example, the RS linkage may include infor- mation on a mapping relation between RS types as well as a mapping relation between RS resources. For example, each RS linkage candidate may define a mapping relation between one reference RS resource and at least one target RS resource.

In addition, the terminal may receive information on a specific RS linkage that is activated or valid among at least one candidate for the RS linkage from the base station.

For example, information on a specific RS linkage may be indicated to the terminal through higher layer (e.g., MAC CE) or lower layer (e.g., DCI) signaling.

Accordingly, the terminal may determine the target RS resource(s) mapped to the reference RS resource based on the specific RS linkage. For example, the reference RS resource may be an SRS resource, and the target RS resource may be a DL RS (e.g., SSB and/or CSI-RS) resource.

In step S1520, the terminal may receive information on the first spatial parameter from the base station for the reference RS resource included in the specific RS linkage. The first spatial parameter may be configured/indicated to the terminal through higher layer/lower layer signaling. In addition, the first spatial parameter may be configured/ indicated for the terminal in advance without separate sig- naling.

According to this, RS linkage define a relation in which a first spatial parameter for reference transmission/reception and a second spatial parameter for target transmission/ reception are linked (e.g., a second spatial parameter is changed according to a change of the first spatial parameter).

Here, the second spatial parameter may be the same as the first spatial parameter or a spatial parameter corresponding to the first spatial parameter. For example, the reception spatial parameter (or a reception beam) of the terminal and the transmission spatial parameter (or a transmission beam) of the terminal may have a correspondence according to the implementation of the transmission/reception filter of the terminal. Alternatively, the first reception spatial parameter (or a reception beam) of the terminal may have a correspondence with the second reception spatial parameter (or reception beam), and the first transmission spatial parameter (or a transmission beam) of the terminal may have a correspondence with the second transmission spatial parameter (or a transmission beam).

For example, based on the first spatial parameter for the reference RS resource, the second spatial parameter for the target RS resource may be determined.

In step S1530, the terminal may perform DL reception based on the second spatial parameter for the target RS resource.

For example, the terminal may determine a target RS resource associated with a reference RS resource based on a specific RS linkage, and may determine a second spatial parameter for the target RS resource based on a first spatial parameter for the reference RS resource.

For example, with respect to the reception of downlink reception (e.g., DL RS/DL channel), the terminal may determine the reception beam (or reference RS) of the downlink reception based on the second spatial parameter for the target RS resource, and accordingly perform the DL reception.

For example, the TCI state to be applied for DL reception may be determined based on a DCI scheduling a PDSCH, a CORESET in which the PDCCH is monitored, or a default TCI state, and the like. As the spatial parameter for the TCI state, a second spatial parameter changed/updated based on the above-described information on the RS linkage and/or information on the first spatial parameter may be applied.

According to the example of FIG. 15, based on a first parameter (e.g., spatial-related information, transmission beam-related information, or UL reference RS) of a reference RS resource (e.g., SRS resource), A second spatial parameter (e.g., reception beam, TCI state) of a target RS resource (e.g., DL RS resource) may be dynamically changed/updated while minimizing signaling overhead.

As a specific example, a RS linkage for target DL RS(s) may be configured with respect to a UL RS serving as a reference. In addition, the UL reference RS for the spatial-related information of the reference UL RS may be changed/updated (e.g., via MAC CE). In this case, based on a RS linkage, reference RS information for a beam to be applied to DL RS(s) mapped to the reference UL RS or a configured TCI state may be configured/changed based on the updated UL reference RS.

That is, unlike (or additionally) changing/updating a spatial parameter (or QCL reference RS) configured for the TCI state through the existing RRC/MAC CE signaling, change/update of a spatial parameter for the reference UL RS resource may be applied to change/update of a spatial parameter configured for the TCI state.

Accordingly, by using spatial-related information in addition to the TCI state, it is possible to increase association flexibility for DL reception beam determination. In addition, beam indication/determination for a dynamic transmission/reception RS/channel is possible through beam change/update based on UL/DL RS linkage. In addition, according to a specific RS linkage, a beam configuration/indication related field may be omitted in the DCI, so there is an advantage of reducing the DCI payload size.

In addition, in order to prevent a collision between a RS linkage-based operation according to the present disclosure and an existing UL/DL reference RS configuration operation, an enabler (or enable parameter) indicating whether embodiments of the present disclosure are applied or not may be defined and used. For example, by configuring a parameter (e.g., 'RS_linkage_enabler') for whether beam configuration/update operation is enabled through application of RS linkage information in RRC configuration, when the corresponding parameter indicates disable or 'OFF', the existing operation is followed, and when the corresponding parameter indicates enable or 'ON', examples of the present disclosure may be activated.

Hereinafter, various examples of the present disclosure for RS linkage-based DL transmission/reception will be described.

Embodiment 1

The base station may configure information on a RS linkage to the terminal through higher layer signaling (e.g., RRC signaling/MAC CE signaling).

The information on the RS linkage may define a mapping relation between a reference RS resource (e.g., an SRS resource) and a target RS resource (e.g., an SSB/CSI-RS resource).

In addition, information on the first spatial parameter for the reference RS resource may be configured/indicated for the terminal by the base station. For example, spatial relation info for each of at least one SRS resource may be changed/updated through MAC CE.

In this case, based on the information on the RS linkage, the TCI state associated with the configuration/indication of the second spatial parameter (e.g., reception beam) of the target RS resource (e.g., DL RS(s)) may be changed/updated based on the first spatial parameter (e.g., spatial-related information) that is changed/updated with respect to the reference RS resource (e.g., SRS resource).

For example, the DL reference RS (e.g., CSI-RS, SSB) that is used for configuring reception spatial domain filter(s) of the target RS resource may be changed/updated, based on the updated UL reference RS (e.g., CSI-RS, SSB, SRS) that is the first spatial parameter for the reference RS resource. Here, information on the above-described RS association may be representing a mapping relation between the reference RS resource (e.g., UL RS(s)) in which the first spatial parameter (e.g., spatial related information) is changed/updated and the target RS resource in which the second spatial parameter is expected to be changed/updated.

Table 11 shows an example of a RS linkage.

TABLE 11

| RS linkage | DL RS (target RS resource) | UL RS (reference RS resource) |
|---|---|---|
| #1 | CSI-RS resource #3 | SRS resource #1 |
| #2 | SSB resource #2 | SRS resource #2 |

In the example of Table 11, the reference RS is a UL RS, and the target RS is a DL RS. For example, SRS resource #1, which is a reference RS resource, may be mapped to CSI-RS resource #3, which is a target RS resource, and SRS resource #2, which is a reference RS resource, may be mapped to SSB resource #1, which is a target RS resource. If the first spatial parameter (e.g., spatial relation info) for SRS resource #1, which is the reference RS resource, is changed/updated to CSI-RS resource #2 through MAC CE, the second spatial parameter for the CSI-RS resource #3, which is the target RS resource, may be changed to a spatial parameter utilized (or based on) when receiving the CSI-RS resource #2, which is the first spatial parameter.

Table 12 shows an additional example of a RS linkage.

TABLE 12

| RS linkage | DL RS (target RS resource) | UL RS (reference RS resource) |
|---|---|---|
| #1 | Set A = {CSI-RS resource #1, SSB resource #2} | SRS resource #3 |
| #2 | Set B = {CSI-RS resource #2, SSB resource #1} | SRS resource #4 |

In the example of Table 12, a plurality of target RS resources (or target RS resource sets) may be mapped to one reference RS resource. For example, SRS resource #3, which is a reference RS resource, may be mapped to CSI-RS resource #1 and SSB resource #2d, which are target RS resource(s), and SRS resource #4, which is a reference RS resource, may be mapped to CSI-RS resource #2 and SSB resource #1, which are a target RS resource.

If the first spatial parameter (e.g., spatial relation info) for SRS resource #3 that is the reference RS resource is changed/updated to CSI-RS resource #3 through MAC CE, both a second spatial parameter for CSI-RS resource #1 that is a target RS resource and a second spatial parameter for SSB resource #2 that is a target RS resource may be changed to a spatial parameter utilized (or based on) when receiving the CSI-RS resource #3, which is the first spatial parameter.

The information on a RS linkage as described above may include information on candidate(s) of the RS linkage.

In this case, a specific RS linkage among at least one RS linkage candidates may be configured/indicated by the base station to the terminal. A specific RS linkage may be configured/indicated through, for example, MAC CE. A specific RS linkage may correspond to an activated RS linkage. That is, based on the activated RS linkage, based on the change/update of the first spatial parameter for the reference RS resource as described above, the second spatial parameter for the target RS resource may be changed/updated.

For example, in the example of Table 11 or Table 12, an index or ID for RS linkage may be given, and an index or ID for a specific RS linkage may be configured/indicated for the terminal. The specific RS linkage to be activated may be one or plural.

In this way, when a specific RS linkage is configured/indicated, the specific RS linkage may be applied after a predetermined time (until an update for the activation of the next specific RS linkage). For example, the predetermined time may be defined as X time after the terminal successfully decodes a PDSCH carrying a MAC CE that configures/indicates a specific RS linkage, and then transmits HARQ-ACK information for the PDSCH. For example, X may be defined as a time unit such as a predetermined number of symbols/symbol groups/slots/slot groups/subframes, and the like or as an absolute time length such as 3 msec.

Embodiment 2

This embodiment relates to a method of changing/updating the second spatial parameter for the target RS resource based on the change/update of the first spatial parameter for the reference RS resource.

For example, after a RS linkage, which is a mapping relation between a reference RS resource and a target RS resource, is established through RRC signaling, a first spatial parameter (e.g., aperiodic/semi-static SRS spatial-related information) for the reference RS resource may be changed/updated through MAC CE. In this case, the target RS resource(s) mapped to the reference RS resource may be specified based on the RS linkage, and the second spatial parameter for the specified target RS resource(s) may be changed/updated based on the first spatial parameter.

In this case, the following examples may be applied to change/update of the second spatial parameter for the target RS resource(s). That is, when RS linkage according to the present disclosure is applied, based on the MAC CE for the first spatial parameter (e.g., spatial-related information) for the reference RS resource (e.g., SRS resource), in determining/changing/updating the second spatial parameter (e.g., spatial reception parameter) of the target RS resource (e.g., DL RS resource(s)) according to the RS linkage, various examples may be applied to an object of applying the first spatial parameter to a reception beam of the target RS resource.

In this regard, the RS linkage-based operation according to the present disclosure may be performed in addition to TCI state change/update. That is, when the spatial parameter applied for DL transmission/reception is based on the TCI state, the TCI state may indicate a specific DL/UL RS as a DL reference RS. This is called a TCI state-based DL spatial parameter. In addition to this, the second spatial parameter for the target RS resource mapped to the reference RS resource may be changed/updated based on the RS linkage, and DL transmission/reception can be performed based on the changed/updated second spatial parameter for the target RS resource. This is called an RS linkage-based DL spatial parameter.

When the above-described TCI state-based DL spatial parameter and the RS linkage-based DL spatial parameter coexist, there may be ambiguity as to which DL transmission/reception is performed based on. Therefore, it is necessary to define an application method of the TCI state-based DL spatial parameter and the RS linkage-based DL spatial parameter.

For example, the second spatial parameter may be changed/updated for the target RS resource(s) specified by a RS linkage (i.e., embodiment 2-1 below), or the TCI state associated with the target RS resource(s) specified by a RS linkage may be changed/updated (i.e., RS linkage-based TCI state change/update).

Embodiment 2-1

This embodiment relates to a method of updating the second spatial parameter based on the first spatial parameter of the reference RS resource, only for the RS linkage target RS resource.

For example, when a RS linkage for the target RS resource(s) is configured, the spatial parameter for the corresponding target RS resource(s) may not follow the preconfigured TCI state, but a changed/updated second spatial parameter may be applied based on the first spatial parameter for the reference RS resource based on the RS linkage. That is, compared to the TCI state-based DL spatial parameter, the RS linkage-based DL spatial parameter may have a higher priority. Alternatively, the TCI state-based DL spatial parameter may be (temporarily) overridden with the RS linkage-based DL spatial parameter. In this case, the DL spatial parameter configured (via RRC/MAC CE) for the TCI state may be not changed, but the terminal may perform DL reception by referring a RS linkage-based spatial parameter, not a TCI state-based DL spatial parameter (that is, ignores the TCI state-based DL spatial parameter).

Embodiment 2-1 corresponds to an example of changing the DL reception beam only in the mapping relation between the reference RS resource and the target RS resource configured according to a RS linkage. That is, although the spatial reception parameter according to the TCI state is already configured for each target RS resource (e.g., DL RS(s)), if the enabler for RS linkage-based operation is configured to 'ON', in the application time for the update of the first spatial parameter based on the MAC CE for the reference RS resource (e.g., 3 msec from the transmission timing of the HARQ-ACK for the MAC CE), DL transmission/reception may be performed based on a second spatial parameter (e.g., a spatial reception parameter) that is used/utilized/corresponding the updated first spatial parameter.

According to the embodiment 2-1, it is possible to indicated a spatial parameter related operation only for the target RS resource(s) of the RS linkage that is optimized and configured according to a specific purpose. In addition, when configuring/indicating a specific RS linkage based on the ID for the RS linkage of Embodiment 1, the second spatial parameter to be applied for DL reception and target RS resource(s) may be dynamically indicated through MAC CE.

Embodiment 2-2

This embodiment relates to a method of changing/updating a TCI state based on a RS linkage.

For example, when a RS linkage for the target RS resource(s) is configured, the spatial parameter configured by the TCI state preconfigured for the corresponding target RS resource(s) may be replaced with a second spatial parameter that is changed/updated based on the first spatial parameter for the reference RS resource based on the RS linkage. That is, the TCI state-based DL spatial parameter may be changed/updated to the second spatial parameter for the RS linkage-based target RS resource (or based on the first spatial parameter for the RS linkage-based reference RS resource). Alternatively, the TCI state itself may be changed/updated by overriding the DL reference RS in the TCI state with the UL reference RS updated based on the RS linkage. In this case, the DL spatial parameter configured for the TCI state (via RRC/MAC CE) may be changed. Accordingly, when the terminal applies the TCI state-based DL spatial parameter or applies the RS linkage-based DL spatial parameter, DL reception may be performed based on the same spatial parameter.

Unlike Embodiment 2-1 in which the DL reception beam is changed limitedly in the mapping relation between the reference RS resource and the target RS resource configured according to a RS linkage, Embodiment 2-2 corresponds to an example of changing a spatial parameter (e.g., DL reference RS) for a preconfigured TCI state(s) to a first spatial parameter (e.g., an updated UL reference RS).

For example, it is assumed that the first spatial parameter (or updated UL reference RS) updated for the reference RS resource is SSB resource #1, and target RS resources configured by a RS linkage are CSI-RS resource #4 and CSI-RS resource #5. In addition, it is assumed that the preconfigured TCI states for each of the target RS resources are TCI state IDs #1 and #2 of Table 9). In this case, according to Embodiment 2-2, both reference RSs of TCI state IDs #1 and #2 may be changed/updated to SSB resource #1.

This may be said that the TCI state itself is updated by the MAC CE indicating the first spatial parameter for the reference RS resource. That is, when TCI state IDs #1 and #2 are configured/indicated for at least one specific UL/DL transmission/reception for the terminal, all the transmission/reception beams (or spatial parameters) for the specific at least one UL/DL transmission/reception are RS It may be changed/updated based on the first spatial parameter for the reference RS resource of the association.

According to Embodiment 2-2, a small signaling overhead may be required as compared to a change/update of a TCI state performed through RRC reconfiguration. In addition, since the change/update of the TCI state is performed through the MAC CE, the TCI state may be changed/updated more dynamically compared to the change/update of the TCI state through the RRC reconfiguration. In addition, based on the transmission beam direction of the first spatial parameter (e.g., updated UL reference RS) updated through MAC CE with respect to the reference RS resource, the second spatial parameter (e.g., DL reference RS) is configured, so that excellent channel quality reflecting the latest channel conditions can be expected. In addition, by changing/updating the TCI state itself based on the first spatial parameter for the reference RS resource, the transmission/reception beam for other UL/DL transmission/reception to which the corresponding TCI state is applied is optimized by reflecting the latest channel state, resulting in higher reliability can be expected.

If the second spatial parameter (or spatial parameter of the TCI state changed/updated based on RS linkage) applied for DL transmission and reception in the above-described examples is a specific UL RS (e.g., SRS) resource, the terminal may receive the DL RS/DL channel based on the spatial reception parameter corresponding to the spatial transmission parameter of the specific UL RS resource.

Figure 16:
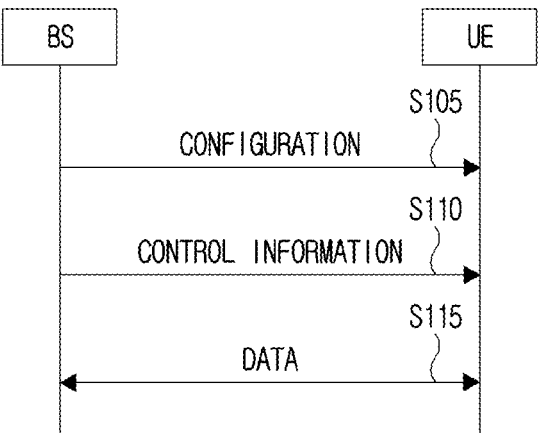
FIG. 16 is a diagram for explaining a signaling process according to an embodiment of the present disclosure.

FIG. 16 is a diagram for explaining a signaling process according to an embodiment of the present disclosure.

An example of the signaling operation of the base station and the terminal for the above-described embodiments may be as shown in FIG. 16. Here, the terminal/base station is just an example, and it may be substituted for various devices as described in FIG. 17. The base station may correspond to one base station including a plurality of TRPs or one cell including a plurality of TRPs. FIG. 16 is for convenience of description, and does not limit the scope of the present disclosure. Also, some of the steps described in FIG. 16 may be merged or omitted. In addition, in performing the procedures described below; the above-described downlink transmission/reception operation or uplink transmission/reception operation or beam management operation may be applied, but the scope of the present disclosure is not limited thereto, and various downlink reception or uplink transmission operations can be applied.

The UE may receive configuration information (Configuration) from the base station (S105). The Configuration may include system information (SI), scheduling information, beam management (BM) related settings (e.g., DL BM related CSI-ResourceConfig IE, NZP CSI-RS resource set IE, etc.), the configuration of the base station (e.g., TRP configuration) information and the like. For example, the Configuration includes information related to reconfiguration/update of RS information for spatial-related (e.g., QCL-related) assumption (e.g., information related to whether reconfiguration/update is performed, performing method, timing, etc.). In addition, the configuration may include information on whether to activate a specific RS linkage and/or a RS linkage candidate. The configuration may be transmitted through higher layer (e.g., RRC or MAC CE) signaling. In addition, when the configuration is predefined or preconfigured, the corresponding step may be omitted.

For example, based on the above-described embodiments, the Configuration may include information on at least one of TCI state(s), QCL RS(s), or DMRS port(s). For example, the TCI state may include RS information for spatial relation (e.g., QCL relation) assumption. For example, the configuration may include spatial-related information/QCL-related configuration information for a DL channel (e.g., PDCCH/PDSCH) and/or a UL channel (e.g., PUSCH/PUCCH).

For example, as described in the above-described embodiments, the Configuration may include linkage relation configuration between the reference RS resource and the target RS resource (e.g., information on RS linkage). For example, the target RS resources may be grouped and configured as at least one set. For example, the Configuration may include information indicating change/update of the first spatial parameter for the reference RS resource and/or information indicating change/update of RS linkage.

For example, the operation of receiving the Configuration, by the UE (100/200 in FIG. 17), from the base station (200/100 in FIG. 17) in the above-described step S105 may be implemented by the apparatus of FIG. 17 to be described below. For example, referring to FIG. 17, one or more processors 102 may control one or more transceivers 106 and/or one or more memories 104, etc. to receive the Configuration, and one or more transceivers 106 may receive the configuration from the base station.

The UE may receive control information from the base station (S110). The control information may be received through a control channel (e.g., PDCCH). For example, the control information may be DCI/UCI. For example, the control information may include scheduling information for a downlink data channel (e.g., PDSCH) and/or an uplink channel (e.g., PUCCH/PUSCH) and the like. For example, based on the above-described embodiments, the control information may include information on at least one of TCI state(s), QCL RS(s), or DMRS port(s). For example, one or more TCI states may be indicated for DMRS port(s) related to a DL data channel (e.g., PDSCH)/UL channel (e.g., PUCCH/PUSCH) by the TCI state field in the control information (e.g., DCI). For example, the TCI state may include RS information for spatial relation (e.g., QCL relation) assumption.

For example, the operation of receiving the control information, by the UE (100/200 in FIG. 17), from the base station (200/100 in FIG. 17) in the above-described step S110 may be implemented by the apparatus of FIG. 17 to be described below. For example, referring to FIG. 17, one or more processors 102 may control one or more transceivers 106 and/or one or more memories 104, etc. to receive the control information, and one or more transceivers 106 may receive the control information from the base station.

The UE may receive data from the base station or transmit data to the base station (S115). The data may be received through a downlink channel (e.g., PDCCH/PDSCH) or transmitted through an uplink channel (e.g., PUCCH/PUSCH/PRACH). In addition, the data may be a downlink signal (e.g., SSB/CSI_RS), an uplink signal (SRS). For example, the data may be scheduled based on the control information. In addition, the data may be received based on the information configured/indicated in steps S105/S110. For example, based on the information configured/indicated in steps S105/S110, the UE may perform channel estimation/compensation and may receive the data.

For example, based on the above-described embodiments, a spatial relation-related RS (e.g., QCL type D RS) for data reception may be configured. For example, a target RS resource mapped to a reference RS resource may be specified based on RS linkage, and a second spatial parameter for the target RS resource may be changed/updated based on a first spatial parameter configured/updated for the reference RS resource.

For example, for the terminal, the second spatial parameter for the target RS resource may be changed/updated based on the first spatial parameter for the reference RS resource, and DL transmission/reception may be performed based on the second spatial parameter instead of the TCI state for DL transmission/reception, or the TCI state for DL transmission/reception may be changed/updated based on the second spatial parameter and DL transmission/reception may be performed based on the corresponding TCI state or the second spatial parameter.

For example, the operation of receiving the data, by the UE (100/200 in FIG. 17), from the base station (200/100 in FIG. 17) in the above-described step S115 may be implemented by the apparatus of FIG. 17 to be described below. For example, referring to FIG. 17, one or more processors 102 may control one or more transceivers 106 and/or one or more memories 104, etc. to receive the data, and one or more transceivers 106 may receive the data from the base station.

As mentioned above, the above-described base station/UE signaling and operation (e.g., embodiment 1, embodiment 2, FIGS. 15, 16, etc.) can be implemented by the apparatus of FIG. 17 to be described below. For example, the base station may correspond to the first wireless device, the UE may correspond to the second wireless device, and vice versa may be considered in some cases.

Figure 17:
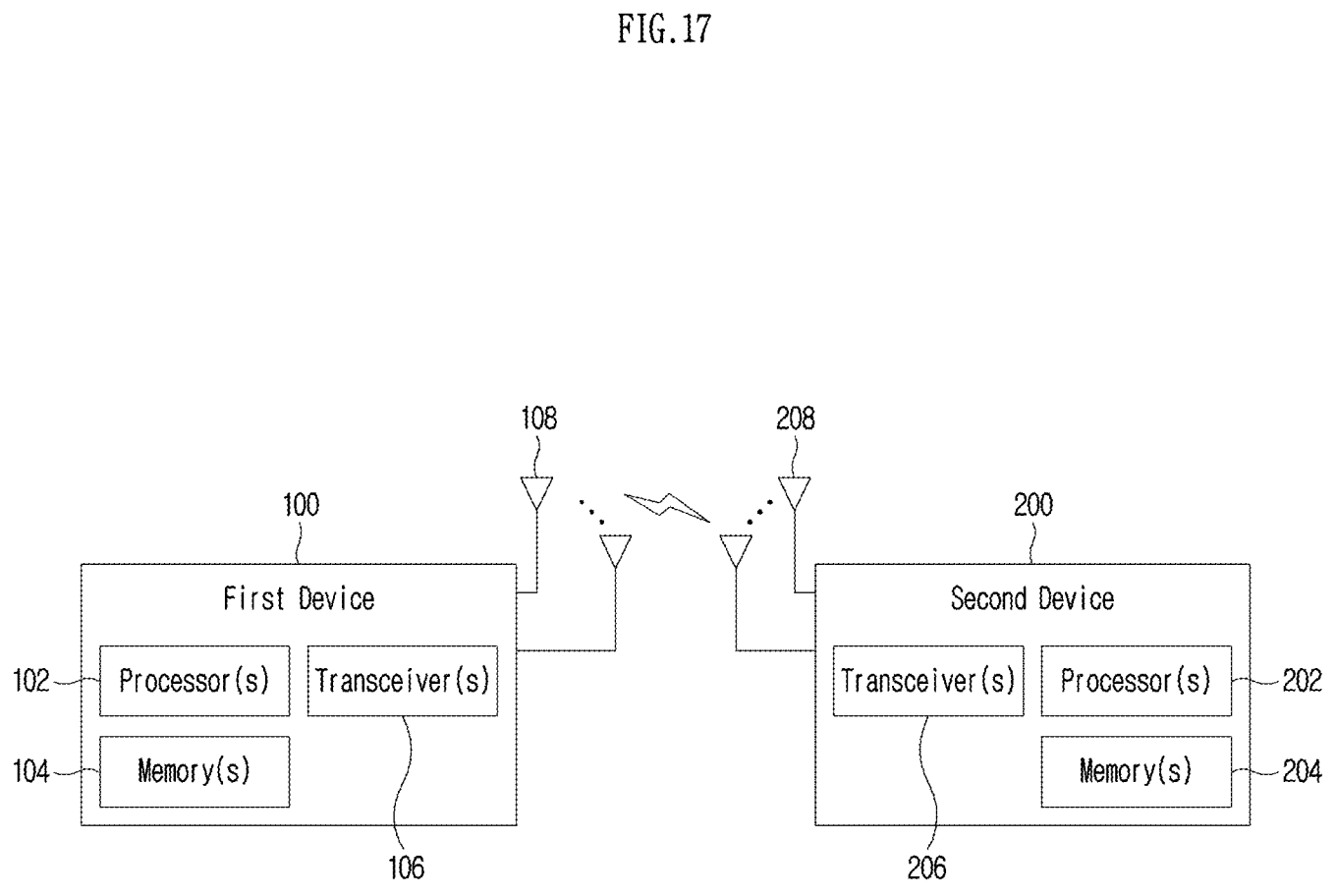

For example, the base station/UE signaling and operation (e.g., embodiment 1, embodiment 2, FIGS. 15, 16, etc.) described above may be processed by one or more processors (e.g., 102, 202) of FIG. 17, and the above-described base station/UE signaling and operation (e.g., embodiment 1, embodiment 2, FIG. 15, FIG. 16, etc.) may be stored in a memory (e.g., one or more memories 104 and 204 of FIG. 17) in the form of an instruction/program (e.g., instruction, executable code) for driving at least one processor of FIG. 17 (e.g., 102 and 202).

General Device to which the Present Disclosure May be Applied

FIG. 17 illustrates a block diagram of a wireless communication device according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrow band Internet of Things for a low-power communication as well as LTE, NR and 6G. Here, for example, an NB-IOT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
   receiving configuration information for a mapping between a first resource for uplink transmission and at least one second resource for downlink reception;
   receiving information for a spatial parameter for the first resource,
   wherein the information includes reference signal information for a spatial relation for the first resource; and
   determining a spatial parameter for the at least one second resource based on the mapping and the reference signal information.

2. The method of claim 1,
   wherein the configuration information includes at least one mapping candidate, and
   wherein each of the at least one mapping candidate is based on a unique combination of a resource for uplink transmission and at least one resource for downlink reception.

3. The method of claim 1, wherein the receiving the configuration information comprises:

receiving information for at least one mapping candidate; and receiving information for activation of the mapping among the at least one mapping candidate.

4. The method of claim 1, wherein the information is received through a medium access control (MAC) control element (CE) and wherein the mapping is activated after a predetermined time from a transmission timing of acknowledgement/non-acknowledgement (ACK/NACK) for the MAC CE.

5. The method of claim 1, wherein, based on that the first resource is a predetermined uplink reference signal, the spatial parameter for the first resource is indicated by spatial relation information, and wherein the spatial parameter for the at least one second resource is determined based on the spatial relation information.

6. The method of claim 1, wherein a transmission configuration indicator (TCI) state information is preconfigured for the at least one second resource, and wherein the TCI state information includes another reference signal information for a spatial relation for the at least one second resource.

7. The method of claim 6, wherein the spatial parameter for the at least one second resource is determined based on the mapping and the reference signal information, instead of the another reference signal information.

8. The method of claim 6, wherein the determining the spatial parameter for the at least one second resource comprises updating the TCI state information by replacing the another reference signal information with the reference signal information.

9. The method of claim 1, further comprising:

receiving information for whether the spatial parameter for the at least one second resource is determined based on the mapping or not.

10. The method of claim 1, wherein correspondence between the spatial parameter for the first resource and the spatial parameter for the at least one second resource is predetermined.

11. The method of claim 1, wherein the first resource includes a sounding reference signal (SRS) resource, and wherein the at least one second resource includes at least one of a channel state information-reference signal (CSI-RS) or a synchronization signal block (SSB) resource.

12. An apparatus comprising:

at least one transceiver; and at least one processor coupled with the at least one transceiver, wherein the at least one processor is configured to:

receive configuration information for a mapping between a first resource for uplink transmission and at least one second resource for downlink reception;

receive information for a spatial parameter for the first resource, wherein the information includes reference signal information for a spatial relation for the first resource; and determine a spatial parameter for the at least one second resource based on the mapping and the reference signal information.

13. A method comprising:

transmitting configuration information for a mapping between a first resource for uplink transmission and at least one second resource for downlink reception; and transmitting information for a spatial parameter for the first resource, wherein the information includes reference signal information for a spatial relation for the first resource, and wherein a spatial parameter for the at least one second resource is based on the mapping and the reference signal information.

14. A non-transitory computer-readable medium storing at least one computer program comprising instructions that, when executed by at least one processor, cause the at least one processor to:

receive configuration information for a mapping between a first resource for uplink transmission and at least one second resource for downlink reception;

receive information for a spatial parameter for the first resource, wherein the information includes reference signal information for a spatial relation for the first resource; and determine a spatial parameter for the at least one second resource based on the mapping and the reference signal information.

* * * * *